United States Patent [19]

Abe et al.

[11] Patent Number: 4,563,115
[45] Date of Patent: Jan. 7, 1986

[54] CUTTING MACHINE HAVING STOCK SUCTION MEANS

[75] Inventors: Hitoshi Abe; Sadao Kojima, both of Utsunomiya, Japan

[73] Assignee: Kyoritsu Seiki Corporation, Utsunomiya, Japan

[21] Appl. No.: 533,694

[22] Filed: Sep. 19, 1983

[30] Foreign Application Priority Data

Sep. 17, 1982 [JP] Japan .............................. 57-161018

[51] Int. Cl.⁴ .................... B23C 7/00; B23B 47/34; B23Q 11/06
[52] U.S. Cl. .................................... 409/134; 51/273; 408/67; 408/241 G; 408/710; 409/137
[58] Field of Search ................ 29/568; 409/137, 134, 409/136; 408/241 G, 67, 710; 141/8, 65; 51/273

[56] References Cited

U.S. PATENT DOCUMENTS

| 2,343,875 | 3/1944 | Schwartz | 409/137 X |
| 3,334,450 | 8/1967 | Prince | 408/710 |
| 3,583,821 | 6/1971 | Shaub et al. | 408/241 G |
| 3,786,846 | 1/1974 | Mehring | 51/273 X |
| 4,037,982 | 7/1977 | Clement | 409/137 |
| 4,200,417 | 4/1980 | Hager et al. | 408/67 |

FOREIGN PATENT DOCUMENTS

| 2160331 | 6/1973 | Fed. Rep. of Germany | 408/67 |
| 603336 | 4/1926 | France | 408/241 G |
| 653087 | 3/1979 | U.S.S.R. | 409/134 |
| 876371 | 11/1981 | U.S.S.R. | 409/134 |

Primary Examiner—William R. Briggs
Attorney, Agent, or Firm—Armstrong, Nikaido, Marmelstein & Kubovcik

[57] ABSTRACT

A unit case having the shape of a hollow cylinder is demountably mounted in a tapered hole of a spindle by use of a unit holding member and a stock suction nozzle is demountably mounted on the tip end portion of said unit case through a cover member. An end of a suction pipe led to the inside of the hollow of said unit case is fixed on the rear end portion of said unit case, and a stock suction means such as a vacuum pump is provided on the other end portion of said suction pipe through a cleaner.

2 Claims, 15 Drawing Figures

CUTTING MACHINE HAVING STOCK SUCTION MEANS

BACKGROUND

This invention relates to a cutting machine having a stock suction means and more particularly to a cutting machine having a stock suction means which successively sucks up stock (chip) produced during cutting operations in a machining center with an automatic tool change (ATC) means. In the conventional tool of this type, stock or chip produced during cutting operations are generally left as it is until the machining operation is finished. However, machining with a great amount of stock being remained results in the following problems: Machinability is deteriorated remarkably and the cutting edge of tool is easily worn and damaged; further, the machining accuracy will be reduced if the stock overflows when a workpiece is changed by a pallet changer or if the cut-out chip falls on the reference surface or the like.

SUMMARY

An object of the present invention is to provide a cutting machine having a stock suction means for sucking up and remove stock in sequence that is produced while a workpiece is being machined.

Another object of the present invention is to provide a cutting machine having a stock suction means for improving the cutting machining safety and its operation efficiency by removing stock or chip during the cutting machining operation.

Yet another object of the present invention is to provide a cutting machine having a stock suction means for holding the product precision at a high level in any cases.

According to the present invention, abovementioned objectives can be achieved by a cutting machine having a stock suction means of the following configuration. A stock suction nozzle is demountably mounted on a tip end of a unit case having a shape of a hollow cylinder demountably mounted on a spindle, and a suction pipe led to the inside of the hollow of said unit case is connected to a rear end portion of said unit case and a stock suction means is connected to an intermediate position of said suction pipe, thereby successively sucking up stock (chip) produced during the cutting operation.

Further, according to the present invention, the rear end portion of a unit case on which a cutting tool is mounted is demountably mounted on a spindle, and with said cutting tool being fitted, a suction nozzle being forced by an elastic means to always protrude is mounted on the tip end portion, said suction nozzle being slidable in the axis direction; and a stock suction means is connected to the rear end portion of said unit case with a suction pipe led to the inside of the hollow of said unit case.

Other objects, features, and advantages of this invention will become apparent from the following description of the preferred embodiments when taken in conjunction with the accompanying drawings.

PREFERRED EMBODIMENTS

Figures 1, 2:
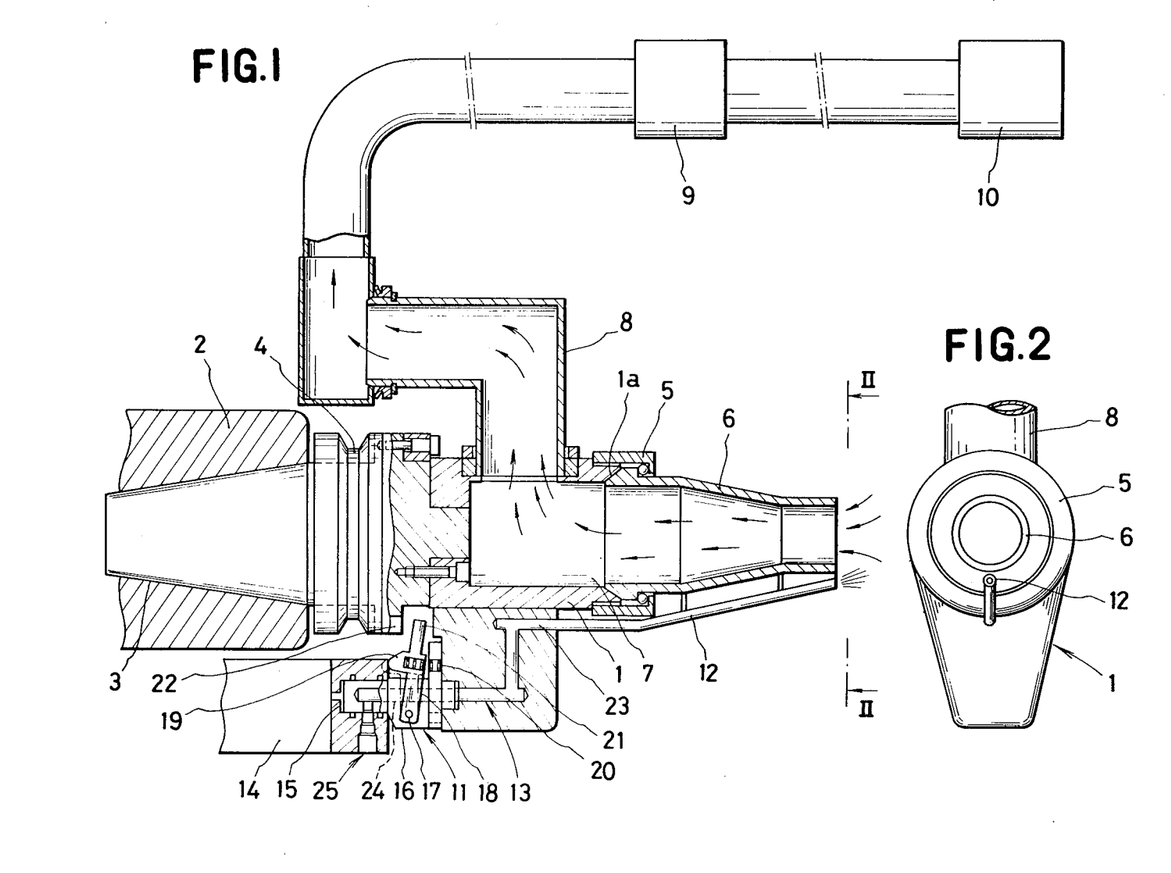
FIG. 1 shows a cross-sectional front view of a cutting machine according to the present invention.
FIG. 2 is a side view taken in the direction of the line II—II of FIG. 1.

FIGS. 1 and 2 illustrate a first embodiment of the present invention. A unit case 1 having the shape of a hollow cylinder is mounted demountably in a tapered hole 3 of a spindle 2 through a unit holding member 4. On the tip end portion 1a of the unit case 1, a stock suction nozzle 6 is demountably mounted through a cover member 5.

The end of a suction pipe 8 led to the inside of a hollow portion 7 of the unit case 1 is mounted on the rear end portion of said unit case 1. A stock suction means 10, for example a vacuum pump, is provided on the other end portion of said suction pipe 8 through a cleaner 9.

On a portion of the periphery of the unit case 1, a rotation stopper means 11 for stopping rotation of the unit case 1 and an air supplying means for injecting air to the tip end of the stock suction nozzle 6 through an air supplying pipe 12 are provided.

The rotation stopper means 11 comprises a holding member 16 to be engaged in an engaging groove 15 of a frame 14 and a stopper member 18 rotatably fixed on the holding member 16 with a pin 17. A projection of the stopper member 18 is kept pressed toward the frame 14 by a spring 20 provided between the unit case 1 and the stopper member 18. Further, a projection 21 at an end of the stopper member 16 faces an engaging depression 22 formed in a side wall of the unit holding member 4. The projection 21 of the stopper member 16 is fixed to the engaging depression 22 by the force of the spring 20 when the unit case 1 is removed from the spindle 2, thereby stopping the rotation of the unit case 1 with respect to the unit holding member 4 to perform the positioning operation.

The air supplying means 13 will be described. As explained above, the air supplying pipe 12 for injecting air to the tip of the stock suction nozzle 6 is connected to an air path 23 formed in the unit case 1. The air path 23 is in sequence connected to a path 24 formed in the holding member 16 and to an air path 25 formed in the frame 1. An air supplying pump (not shown) supplies air of a predetermined pressure to the air path 25.

Operations of the cutting machine will be described here. To perform cutting machining with a preprogrammed numerical controlled machine (machining center) with ATC, the stock suction member 10 is driven at the same time when the machining operation is started, thus the pressure in the hollow portion 7 of the unit case 1 is set to the negative state; the stock (chip) produced by the machining is sequentially sucked and removed toward the cleaner 9 through the suction pipe 8 with air injected from the tip of said stock suction nozzle 6.

With the above-mentioned configuration, the cutting machining portion of the workpiece W is not made dirty with chip or stock, and the chip is not dispersed or does not fall on the reference surface when a workpiece is changed with a pallet changer or the like; further, chip will not remain in the lower blind hole for tapping; hence, tapping troubles can be avoided in advance.

Figures 3, 4:
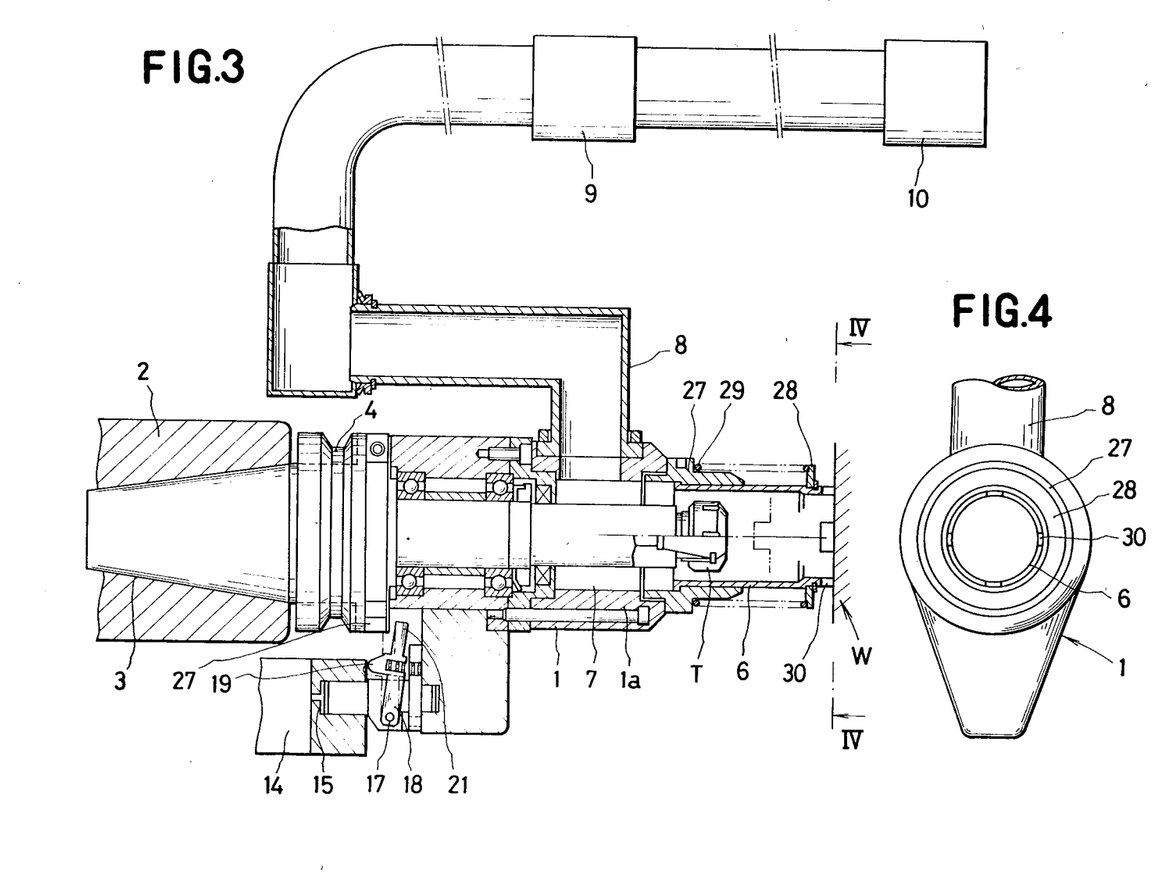
FIG. 3 illustrates a cross-sectional front view of a second embodiment of the present invention.
FIG. 4 is a side view taken in the direction of the line IV—IV of FIG. 3.

FIGS. 3 and 4 show a second embodiment of the present invention. The same reference numerals are assigned to the same constituents of the first embodiment and explanations will be omitted.

In FIGS. 3 and 4, a cutting tool T is mounted in the unit case 1 having the shape of a hollow cylinder.

A suction nozzle 6 having the shape of a hollow cylinder on which the cutting tool T is fixed is slidably mounted in a tip end portion 1a of said unit case 1 through a guide member 27, said suction nozzle 6 being kept protruded by a spring 29 (elastic member) provided between the guide member 27 and a stopper plate 28 fixed on the periphery of the tip end portion of the suction nozzle 6. Moreover, a cut-out depression 30 is formed at the tip end of the suction nozzle 6, thereby facilitating the suction operation for sucking up the chip.

According to this embodiment, when the cutting tool T is pressed against a workpiece W for machining the workpiece W, the suction nozzle 6 pushes the spring 29 and is housed in the unit case 1; at the same time, the cutting tool T is brought into contact with the workpiece W and the machining is initiated. The stock suction means 10 is driven at the same time when the machining is started and the pressure in the hollow portion 7 of the unit case 1 is set to the negative state; the chip produced at the same time when the machining is initiated is successively sucked up and removed to the cleaner 9 through the suction pipe 8 with air injected from the tip end of the stock suction nozzle 6.

Accordingly, the chip is not dispersed and can be completely sucked up on any occasions.

Another embodiment in which above-mentioned stock suction means 10 is used in a machining center will be explained.

Figure 5:
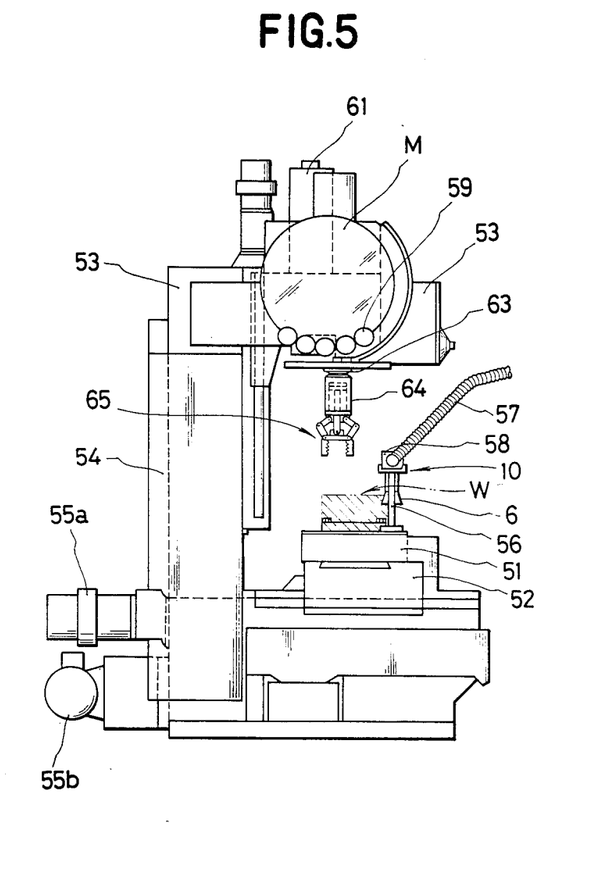
FIG. 5 shows the front view of a machining center in which an embodiment of the present invention is mounted.
Figure 6:
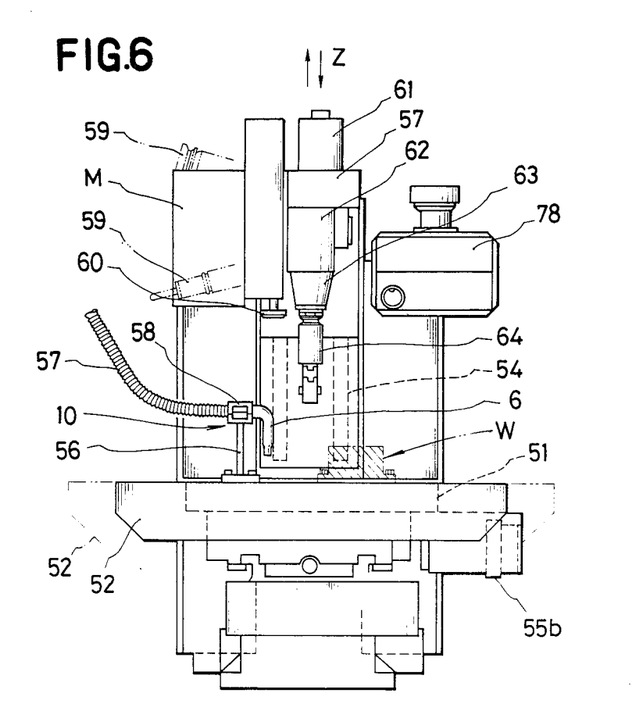
FIG. 6 is a side view corresponding to FIG. 5.
Figure 7:
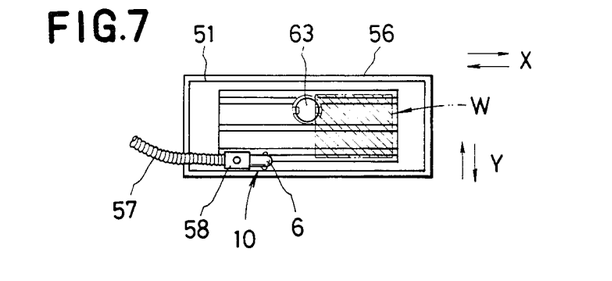
FIG. 7 is a fragmentary plan view of a table.

In FIGS. 5 to 7, a frame 53 having a ⊐ shaped cross-section is mounted along a column 54 on a side of a saddle 52 provided with a table 51 of the machining center, the frame 53 being ascendable and descendable along the column 54.

The table 51 is mounted so as to be moved in the X direction (transversal direction in FIG. 6), Y direction (direction perpendicular to the surface of the sheet on which FIG. 6 is drawn), and Y direction (longitudinal direction in FIG. 6) by driving motors 55a and 55b and, a driving (power) source (not shown) as indicated by arrows in FIG. 6. A workpiece W is demountably mounted on the table 51.

Furthermore, a flexible hose 57 to be connected to a suction driving source (not shown) through a stand 56 is demountably mounted on the table 51, and a suction nozzle 6 having the shape substantially resembling the character L of said stock suction means 10 is installed at the tip end portion of the flexible hose 57 through a block 58.

Figure 8:
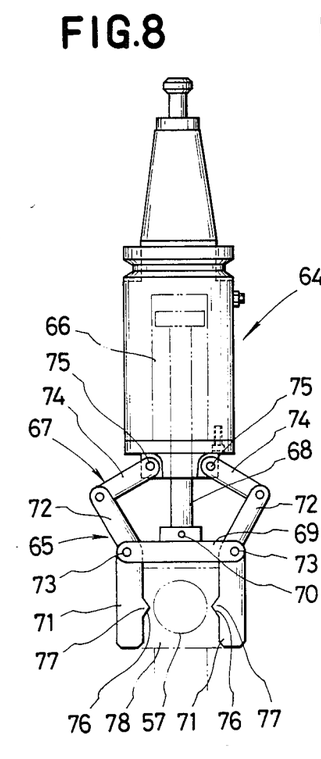
FIG. 8 is the front view of a hand robot.
Figure 9:
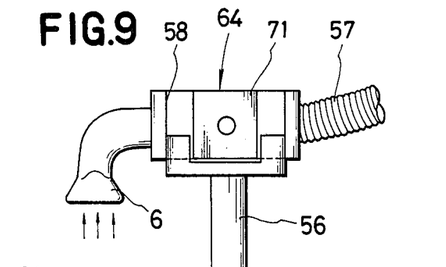
FIG. 9 shows a side view of a hand robot.

An ATC tool magazine M (magazine for automatically changing tools) in which a plurality of cutting tools 59 are installed is mounted in the upper portion of the column 54, and an ATC arm 60, a spindle head 62, and a spindle 63 are mounted on a frame 53 stretching out in parallel with the table 51, the spindle head 62 and spindle 63 being ascendable and descendable by use of a cylinder 61. As shown in FIGS. 8 and 9, an automatically changeable hand robot 64 is demountably mounted on the spindle 63, and a clamp mechanism 65 for a flexible hose 57 comprises a cylinder 66 and a link mechanism 57.

That is, the center of an arm 69 is pivotally fixed on the tip end of a piston rod 68 incorporated in the inside of a cylinder 66 by a pin 70, and the ends on a side of two links 72 having a clamper 71 are rotatably fixed on the ends of the arm 69 by a pin 73; whereas the ends on the other side of the links 72 are rotatably connected to an end portion of the cylinder 66. In the clamper 71, a projection 77 to be fixed to a depression 76 of the block 58 installed at the tip end of the flexible hose 57 is formed for positioning the flexible hose 57 and, at the same time, for preventing the flexible hose 57 from falling and moving.

In FIG. 6, the reference numeral 78 indicates an operator's panel.

Explanations of this embodiment will be given in the following paragraphs. When a workpiece W clamped at a predetermined position on a table 51 is drilled by a cutting tool 59, for example, a borer installed on the ATC arm 60 and the produced chip is sucked and removed, a hand robot 64 mounted on another ATC arm 60 is turned to a predetermined position. And the hand robot 64 is moved to the position of the flexible hose 57, then the depression 76 of the block 68 mounted at the tip end of the flexible hose 57 is clamped by the clamp mechanism 65. The hand robot 64 is moved in the X, Y, and Z directions for the chip on the table 51, and the suction driving source (not shown) is driven to successively suck and remove the chip (stock) through the suction nozzle 6 on the tip end of the flexible hose 57.

Cutting of workpiece W and sucking and removing of the chip (stock) are performed alternately in this way, so the surface of the work table 51 is kept clean, which is effective to hold a high machining accuracy.

Figure 10:
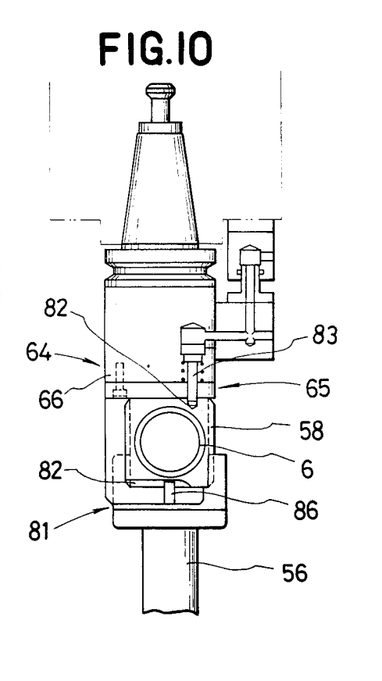
FIG. 10 is a front view of a second embodiment of a hand robot.
Figure 11:
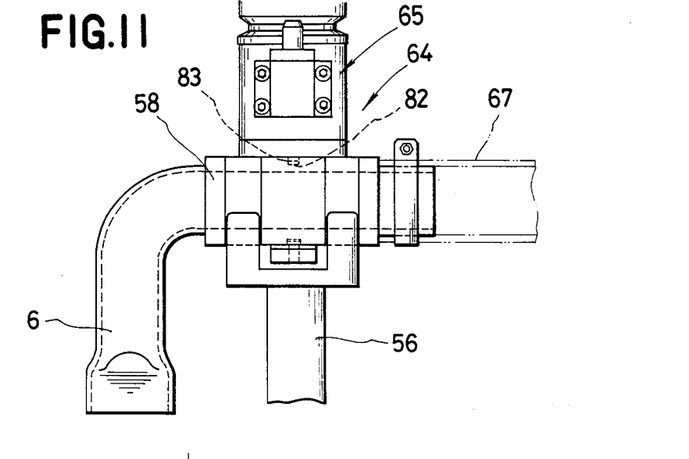
FIG. 11 shows a side view of the second embodiment of hand robot.

FIGS. 10 and 11 show a second embodiment of the clamp mechanism 65 mounted on the hand robot 64. According to this embodiment, a work clamper 81 whose driving source is oil or air is provided in the lower end portion of the cylinder 66. A block 81 of the flexible hose 57 is clamped by the work clamper 81 and the engaging pin 83 is protruded against the depression 82 formed in the block 81 for the positioning operation and for preventing the rotation.

Other configurations and operations are the same as before-stated embodiments, therefore only the same reference numerals are assigned and explanations are omitted.

Figures 12, 13:
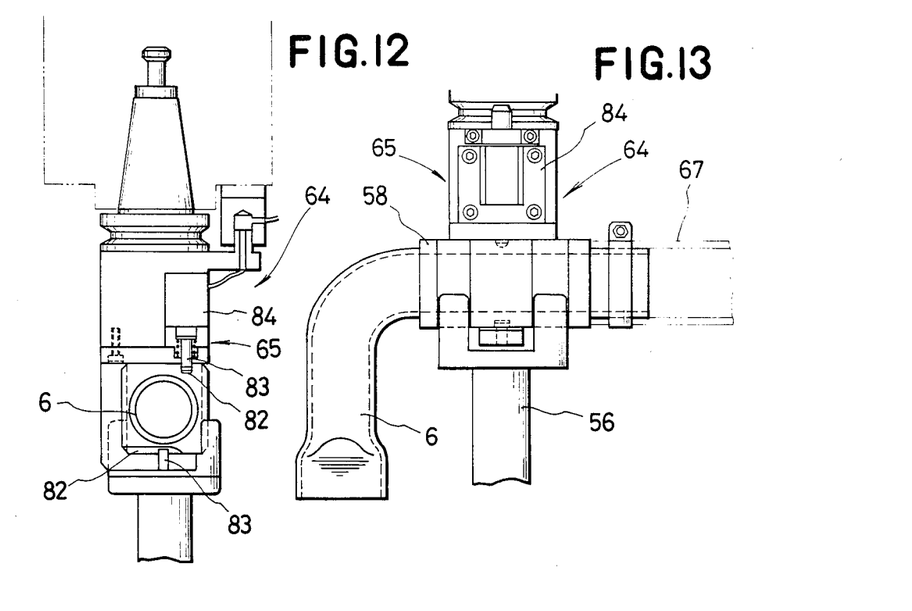
FIG. 12 is a front view of a third embodiment of a hand robot.
FIG. 13 shows a side view of the third embodiment of hand robot.

FIGS. 12 and 13 show a third embodiment of the clamp mechanism provided in the hand robot 64. In this embodiment, an electromagnetic valve 84 is installed as the driving source instead of oil or air used in the second embodiment.

Other configurations and operations are the same as those of the first embodiment, so only the same reference numerals are assigned and explanations are omitted.

Figure 14:
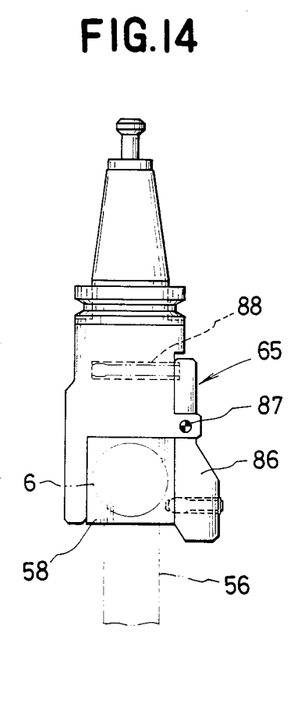
FIG. 14 illustrates a front view of a fourth embodiment of a hand robot.
Figure 15:
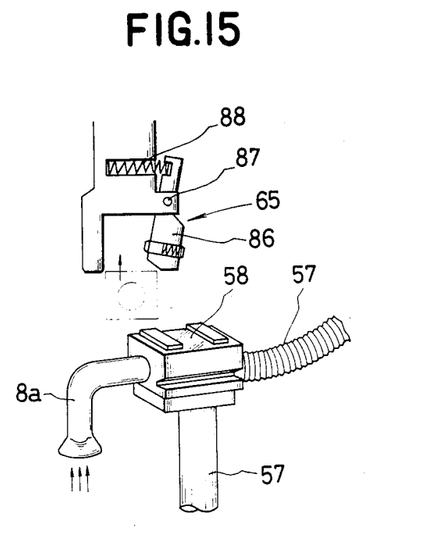
FIG. 15 is a side view of the fourth embodiment of hand robot.

FIGS. 14 and 15 show a fourth embodiment of the clamp mechanism provided in the hand robot 14. In this embodiment, the mechanical clamp mechanism 65 is used. The clamper 86 is rotatably fixed on a side of the hand robot 14 with a pin 87 and a spring 88 at the upper end forces the block 8 to be in the clamping state.

Other configurations and operations are the same as those of above-mentioned embodiments, so only the same reference numerals are assigned and explanations are omitted.

In these embodiments, like in ordinary cutting machines 59, tools can be changed by use of the ATC. Although explanations have been given in conjunction with a vertical-type machining center, the above-mentioned embodiments are applicable also to horizontal-type machining centers. Moreover, the hand robot 54 is provided along the vertical direction, but the clamping direction may be designed to be horizontal.

The hand robot 54 is used for the chip processing, but it is not limited by this explanation, for example, it can be used for other purposes such as air blowing, oil spraying and like operations.

According to those embodiments as explained above, a large space is not necessary for mounting a hose having a great diameter and the chip (stock) produced at workpiece machining is sucked in sequence so that the chip will not remain as it is, thereby improving the cutting machining safety and operation efficiency, further holding the product accuracy to be at a high level.

According to the present invention, a stock suction nozzle is demountably mounted on the tip end portion of a unit case having the shape of a hollow cylinder mounted demountably on a spindle and a stock suction means is connected to the rear end side of the unit case through a suction pipe led to the inside of the hollow of the unit case; further, the rear end portion of the unit case in which a cutting tool is installed is demountably mounted on the spindle, and with the cutting tool being fixed, a suction nozzle formed to be kept protruded by means of an elastic member is mounted on the tip end portion of the unit case, the suction nozzle being slidable in the axis direction; and the stock suction means is connected to the rear end portion of the unit case through the suction pipe led to the inside of the hollow of the unit case. Therefore, the chip (stock) produced at workpiece machining is successively sucked so that the chip does not remain as it is, which is effective to improve the cutting machining safety and operation efficiency, further to hold the product machining accuracy to be at a high level. Since the configuration is quite simple, its production cost can be reduced and only a simple maintenance is required.

We claim:

1. A cutting machine having a frame and a spindle rotatable in said frame comprising:
    a hollow cylindrical case (1) having a rear end portion removably secured to a spindle (2) by means allowing relative rotation of the case and spindle, said case receiving therein a cutting tool (T) secured to said spindle for rotation therewith,
    a suction nozzle (6) mounted at a front end portion of said cylindrical case (1) surrounding said cutting tool (T) and being slidable axially on said cylindrical case, suction nozzle (6) being urged outwardly on said case by spring means (29),
    suction means (10) connected to said cylindrical case (1) through a suction pipe (8) communicated with the hollow interior of said cylindrical case (1), and stopper means (11) on the outer peripheral portion of said cylindrical case engageable with means on said frame (1) for stopping rotation of said cylindrical case.

2. A cutting machine as recited in claim 1, wherein said rotation stopper means (11) comprises a holding member (16) mounted on the machine frame (14) and a stopper member (18) pivotally supported on said holding member (16) by pin (17), said stopper member (18) having a projection (21) at an end portion thereof and facing an engaging depression (22) in unit holding member (4) on cylindrical case (1), wherein, when said case (1) is dismounted from said spindle (2), said projection (21) is brought into engagement with said depression (22) by said spring (20) mounted between said stopper member (18) and said cylindrical case (1).

* * * * *